Apr. 17, 1923.
F. HOENER
1,451,695
SUPPORTING BRACKET FOR AUTOMOBILE VISORS
Filed Dec. 19, 1921
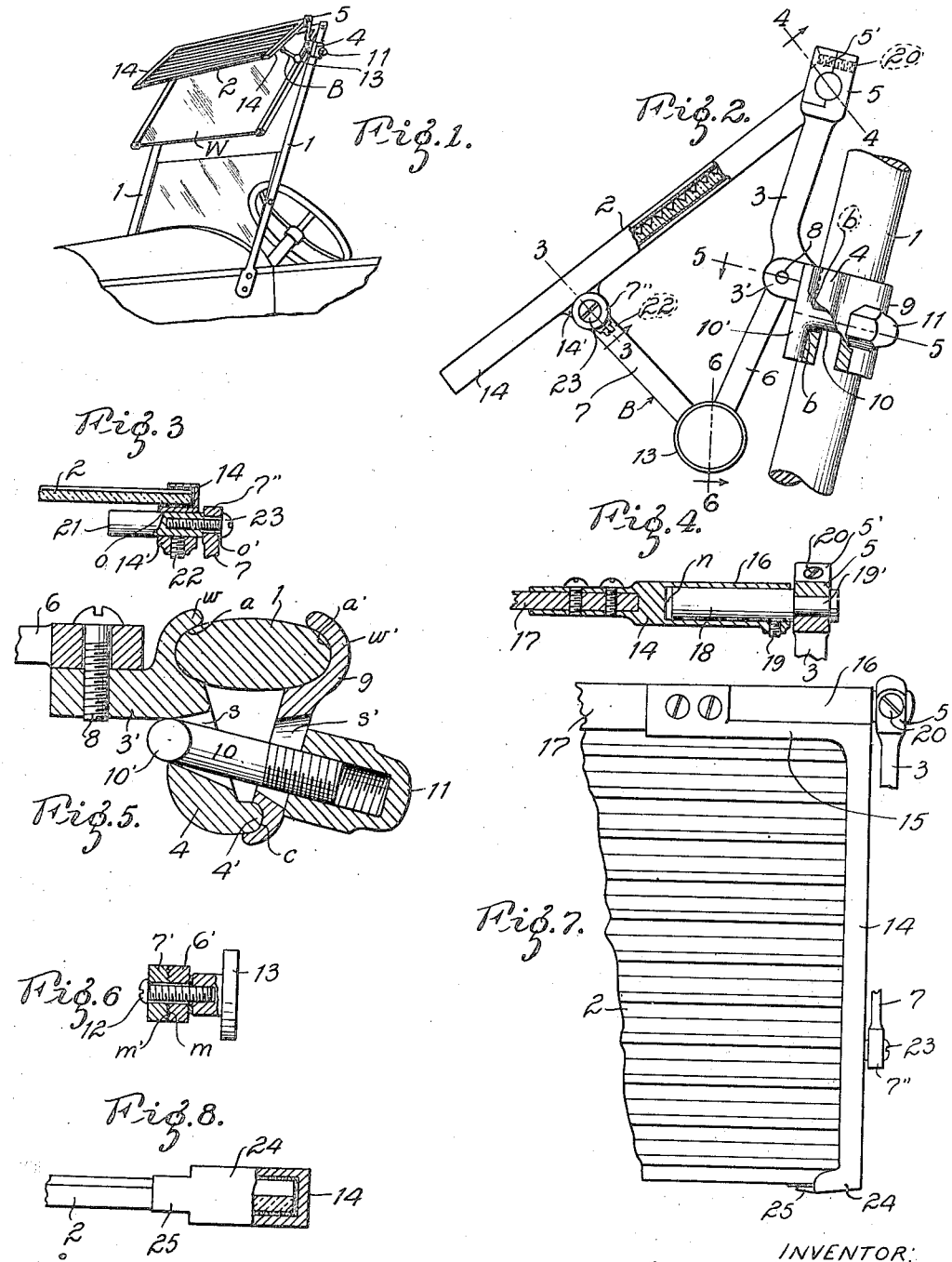
INVENTOR:
FREDERICK HOENER.
BY Harry A. Baines
ATTORNEY.

Patented Apr. 17, 1923.

1,451,695

UNITED STATES PATENT OFFICE.

FREDERICK HOENER, OF ST. LOUIS, MISSOURI, ASSIGNOR TO WILLIAM MODRA, OF ST. LOUIS, MISSOURI.

SUPPORTING BRACKET FOR AUTOMOBILE VISORS.

Application filed December 19, 1921. Serial No. 523,463.

*To all whom it may concern:*

Be it known that I, FREDERICK HOENER, a citizen of the United States, residing at St. Louis, State of Missouri, have invented certain new and useful Improvements in Supporting Brackets for Automobile Visors, of which the following is a specification.

My invention has relation to improvements in supporting brackets for automobile visors, and it consists in the novel features of construction more fully set forth in the specification and pointed out in the claims.

The object of the present invention is to provide a supporting bracket for automobile visors, or shades, that may be adjusted to fit wind-shield standards of different sizes; and one capable of lateral extension so that a pair of supporting brackets may be adjusted so as to accommodate automobiles having wind-shields of varying widths.

Further and other advantages will be better apparent from a detailed description of the invention in connection with the accompanying drawings, in which—

Figure 1 is a perspective view of an automobile wind-shield showing the application of my invention to the standards thereof; Fig. 2 is a side elevation of the bracket and visor supported thereby from the wind-shield standard; Fig. 3 is a sectional detail taken on the line 3—3 of Fig. 2 showing the connection of the visor with the front bracket arm; Fig. 4 is a sectional detail taken on the line 4—4 of Fig. 2 showing the connection of the visor with the top bracket arm; Fig. 5 is an enlarged sectional detail taken on the line 5—5 of Fig. 2 through the bracket clamp that is secured on the wind-shield standard; Fig. 6 is a sectional detail taken on the line 6—6 of Fig. 2 through the connection of the front and bottom bracket arms; Fig. 7 is a plan view of one end of the visor; and Fig. 8 is a front edge view of one end of the visor.

Referring to the drawings, W represents the wind-shield of an automobile mounted between standards 1, 1, which also support the brackets B (there being, of course, a pair of these brackets, one on each standard 1) which in turn support the visor, or shade 2. Since the brackets B are identical, the present description will be confined to one of them. The bracket comprises an upright arm 3, terminating at its lower end in a clamp member 4 and at its upper end in a bearing 5, and a pair of connected lever arms 6 and 7, the former being pivotally connected by a screw 8 to the base 3' of the arm 3 and the latter being connected to the visor as will be hereinafter described. The clamp member 4 is provided with a curved wall, or horn, $w$ projecting inwardly and away from the base 3' of the arm 3, a groove $a$ thus being formed opposite the base 3', and an inwardly turned rounded lip 4' is formed on the free end of the member 4. The clamp member 4 is traversed by a slot $s$ elongated from its juncture with the base 3' toward the lip 4', the ends of said slot flaring inwardly, and a groove $b$ is formed on the outer surface of the clamp on both sides of the slot $s$ and contiguous to the base 3'. A second clamp member 9 is adapted to cooperate with clamp member 4 for engaging the standard 1, the member 9 also being provided with a curved wall $w'$ in which is formed a groove $a'$, and having a groove $c$ extending across its outer end for receiving lip 4' when clamp members 4 and 9 are assembled. An elongated outwardly flaring slot $s'$ is formed in the member 9 between wall $w'$ and groove $c$, and when it is desired to secure the clamp to a standard 1, the members 4 and 9 are disposed on opposite sides of the standard and a T-bolt 10 is passed through slots $s$, $s'$, the head 10' of the bolt resting in grooves $b$. A nut 11 is then passed over the threaded end of the bolt 10 and members 4 and 9 drawn together until the lip 4' rests in the groove $c$ and the standard 1 is clamped into the grooves $a$, $a$, after which the nut is turned up tightly and the bracket secured in place. Obviously the clamp may be secured on standards of different widths because by turning the nut 11 one way or the other the member 9 may be let in or out by swinging it on the lip 4' as a pivot, thereby adjusting the distance between groove $a'$ and groove $a$. The bolt 10 will also have free play in the slots $s$ and $s'$ and it may be swung from side to side with the groove $b$ as a bearing in order to dispose it at right angles to the outer surface of clamp member 9 so the nut 11 may be driven home and bear flat on said surface.

The connected ends of lever arms 6 and 7 terminate in heads 6' and 7' respectively, the engaging faces $m$, $m'$ of said heads being roughened or toothed so that the arms may be held in any adjusted position by means of a bolt 12 traversing the heads and a hand nut or knob 13. The hand nut 13 screws over the threaded end of the bolt 12 on the outside of the arms 6, 7 so that it may be easily reached by the driver within the car.

The visor 2 is mounted between marginal frame members 14, 14, channel-shaped in cross-section for receiving the sides of the visor, each of said frame members having an inwardly turned corner member 15, formed integral with it, said corner member being provided with a socket $n$ formed in an enlargement 16 extending along the edge of the corner member inwardly a substantial distance, beyond which said member is forked to receive the adjacent end of a marginal strip 17 bounding the upper edge of the visor 2. A gudgeon 18 is mounted in the socket $n$ and a set-screw 19 is passed through the wall of the socket for securing the gudgeon in place. The outer end of the gudgeon is provided with a journal 19' of reduced diameter, said journal having a bearing in the bearing 5, and a block, or bearing cap, 5' holds the journal in place, the latter being secured to the bearing 5 by a screw 20. The visor is similarly secured to the outer end of arm 7, a boss 14' being formed on the underside of the frame member 14 about one-third from the outer end thereof, and a pin 21 is mounted in an opening $o$ in the boss and secured in place by a set-screw 22 passed through said boss. The arm 7 terminates at its outer end in an enlarged extremity 7" in which there is formed an opening $o'$ to receive a screw 23, said screw being threaded into a tap in the outer end of the pin 21. The opening $o'$ is large enough so the arm 7 is freely pivotal on screw 23, and the journal 19' is freely rotatable in bearing 5 and block 5', so that on loosening the hand nuts 13 to release the faces $m$, $m'$ of the arms 6, 7 the visor 2 may be adjusted to any desired position after which the hand nuts 13 are again tightened.

The brackets B are capable of being adjusted to different size wind-shields (having standards 1, 1, differently spaced) by merely loosening the set-screws 19 and 22, after which gudgeon 18 and pin 21 may be moved inwardly or outwardly the required amount and the set-screws again tightened. This is a great advantage as it provides a flexibility in mounting the brackets necessary because of the great number of different makes of automobiles.

The outer ends of the frame members 14 are turned inwardly a short distance to provide outer corners 24, and a lip 25 projects inwardly from each corner, said lip being bent in against the edge of the visor to hold the same firmly in place and prevent vibration.

Having described my invention, I claim:

1. A supporting bracket for automobile visors in combination with a fixed support, said bracket being provided with a clamp for securing it to said support, said clamp comprising a member fixed to the bracket, and a member detachable therefrom, the detachable member being fulcrumed at one end of the fixed member, a T-bolt adapted to pass through slots in said members and oscillatable therein, and a nut adapted to be passed over the free end of said T-bolt.

2. In combination with a fixed support, a supporting bracket for automobile visors, said bracket comprising an upright arm provided at one end with a clamp for securing the bracket to said support and at the other end with a journal bearing, a gudgeon adjustably mounted in said visor and journaled in said bearing, a pair of toggle levers having their outer ends pivotally connected to said arm and visor respectively, the connection of the lever with the visor being capable of lateral adjustment, and means for locking the toggle levers in any predetermined position to effect an angular adjustment of the visor.

3. In combination with a fixed support, a supporting bracket for automobile visors, said bracket comprising an upright arm provided at one end with a clamp for securing the bracket to said support, and at the other end with a journal bearing, a gudgeon adjustably connected with the visor and journaled in said bearing, laterally adjustable means for connecting the visor near its free end with said arm, the aforesaid clamp comprising a member fixed to the arm and a member detachable therefrom, the detachable member being fulcrumed at one end of the fixed member, a T-bolt adapted to pass through slots in said members and oscillatable therein, and a nut adapted to be passed over the free end of said T-bolt.

In testimony whereof I hereunto affix my signature.

FREDERICK HOENER.